(12) United States Patent
Manning et al.

(10) Patent No.: US 8,968,435 B2
(45) Date of Patent: Mar. 3, 2015

(54) ABRASIVE PRODUCTS AND METHODS FOR FINE POLISHING OF OPHTHALMIC LENSES

(71) Applicants: James J. Manning, Braintree, MA (US); Mark E. Sternberg, Bryn Mar, PA (US); Jianna Wang, Grafton, MA (US)

(72) Inventors: James J. Manning, Braintree, MA (US); Mark E. Sternberg, Bryn Mar, PA (US); Jianna Wang, Grafton, MA (US)

(73) Assignees: Saint-Gobain Abrasives, Inc., Worcester, MA (US); Saint-Gobain Abrasifs, Conflans-Sainte-Honorine (FR)

(*) Notice: Subject to any disclaimer, the term of this patent is extended or adjusted under 35 U.S.C. 154(b) by 62 days.

(21) Appl. No.: 13/853,877

(22) Filed: Mar. 29, 2013

(65) Prior Publication Data

US 2013/0283702 A1 Oct. 31, 2013

Related U.S. Application Data

(60) Provisional application No. 61/618,058, filed on Mar. 30, 2012.

(51) Int. Cl.
| | |
|---|---|
| *B24D 3/20* | (2006.01) |
| *B24D 3/28* | (2006.01) |
| *B24B 13/01* | (2006.01) |
| *B24D 11/00* | (2006.01) |
| *C09G 1/02* | (2006.01) |
| *C09K 3/14* | (2006.01) |

(52) U.S. Cl.
CPC . *B24D 3/28* (2013.01); *B24B 13/01* (2013.01); *B24D 11/001* (2013.01); *C09G 1/02* (2013.01); *C09K 3/1409* (2013.01); *C09K 3/1436* (2013.01)
USPC .................. 51/295; 51/297; 51/298; 51/307

(58) Field of Classification Search
CPC ........ C09K 3/1436; B24D 11/00; B24D 3/28; C09D 163/00
See application file for complete search history.

(56) References Cited

U.S. PATENT DOCUMENTS

| | | | |
|---|---|---|---|
| 2,277,520 A | 3/1942 | Martin et al. | |
| 3,916,584 A | 11/1975 | Howard et al. | |
| 3,928,949 A | 12/1975 | Wagner | |
| 4,018,574 A | 4/1977 | Dyer | |
| 4,311,489 A * | 1/1982 | Kressner | 51/298 |
| 4,547,204 A | 10/1985 | Caul | |
| 4,576,612 A | 3/1986 | Shukla et al. | |
| 4,609,380 A | 9/1986 | Barnett et al. | |
| 4,629,473 A | 12/1986 | Ruid et al. | |
| 4,644,703 A | 2/1987 | Kaczmarek et al. | |
| 4,652,275 A | 3/1987 | Bloecher et al. | |
| 4,751,138 A | 6/1988 | Tumey et al. | |
| 4,842,619 A | 6/1989 | Fritz et al. | |
| 4,867,759 A | 9/1989 | Tiefenbach et al. | |
| 4,918,874 A | 4/1990 | Tiefenbach, Jr. | |
| 4,920,082 A | 4/1990 | Danielson | |
| 4,927,431 A * | 5/1990 | Buchanan et al. | 51/298 |
| 5,011,513 A | 4/1991 | Zador et al. | |
| 5,014,468 A | 5/1991 | Ravipati et al. | |
| 5,094,670 A | 3/1992 | Imada | |
| 5,108,463 A | 4/1992 | Buchanan | |
| 5,137,642 A | 8/1992 | Castrantas et al. | |
| 5,198,292 A | 3/1993 | Lerner et al. | |
| 5,219,462 A | 6/1993 | Bruxvoort et al. | |
| 5,250,085 A | 10/1993 | Mevissen | |
| 5,256,170 A | 10/1993 | Harmer et al. | |
| 5,304,586 A | 4/1994 | Hammesfahr et al. | |
| 5,328,716 A | 7/1994 | Buchanan | |
| 5,360,462 A | 11/1994 | Harmer et al. | |
| 5,431,596 A | 7/1995 | Akita | |
| 5,436,063 A | 7/1995 | Follett et al. | |
| 5,437,754 A | 8/1995 | Calhoun | |
| 5,453,312 A | 9/1995 | Haas et al. | |
| 5,454,844 A | 10/1995 | Hibbard et al. | |
| 5,549,719 A | 8/1996 | Lee et al. | |
| 5,584,897 A * | 12/1996 | Christianson et al. | 51/295 |
| 5,632,668 A | 5/1997 | Lindholm et al. | |
| 5,667,541 A | 9/1997 | Klun et al. | |
| 5,672,097 A | 9/1997 | Hoopman | |
| 5,730,764 A | 3/1998 | Williamson et al. | |
| 5,766,277 A * | 6/1998 | DeVoe et al. | 51/295 |
| 5,833,724 A | 11/1998 | Wei et al. | |
| 5,840,088 A | 11/1998 | Yang et al. | |
| 5,863,239 A | 1/1999 | Barton, II | |

(Continued)

FOREIGN PATENT DOCUMENTS

| | | |
|---|---|---|
| CN | 1088506 A | 6/1994 |
| CN | 101068656 A | 11/2007 |

(Continued)

OTHER PUBLICATIONS

SK Chemicals Co., Ltd., "Skybon, ES-120 Thermoplastic Copolyester for Solventborne Applications," 1 pg.

(Continued)

*Primary Examiner* — Pegah Parvini
(74) *Attorney, Agent, or Firm* — Joseph P. Sullivan; Abel Law Group, LLP

(57) ABSTRACT

A coated abrasive product including green, unfired abrasive aggregates having a generally spheroidal or toroidal shape, the aggregates formed from a composition comprising abrasive grit particles and a nanoparticle binder, wherein the abrasive aggregates are dispersed within a polymer resin coating, and wherein the coated abrasive product is capable of polishing an optical component, including ophthalmic lenses without the need to apply an abrasive slurry.

19 Claims, 5 Drawing Sheets

(56) References Cited

U.S. PATENT DOCUMENTS

| | | |
|---|---|---|
| 5,863,306 A | 1/1999 | Wei et al. |
| 5,863,847 A | 1/1999 | DeVoe et al. |
| 5,876,268 A | 3/1999 | Lamphere et al. |
| 5,906,490 A | 5/1999 | Kramer Primus et al. |
| 5,913,716 A | 6/1999 | Mucci et al. |
| 5,924,917 A | 7/1999 | Benedict et al. |
| 5,954,844 A | 9/1999 | Law et al. |
| 6,024,634 A | 2/2000 | Hoglund et al. |
| 6,074,281 A | 6/2000 | Swanson et al. |
| 6,077,601 A | 6/2000 | DeVoe et al. |
| 6,171,224 B1 | 1/2001 | Phillips |
| 6,197,076 B1 | 3/2001 | Braunschweig et al. |
| 6,231,629 B1 | 5/2001 | Christianson et al. |
| 6,238,450 B1 | 5/2001 | Garg et al. |
| 6,258,136 B1 | 7/2001 | Kinisky et al. |
| 6,261,682 B1 | 7/2001 | Law |
| 6,287,184 B1 | 9/2001 | Carpentier et al. |
| 6,372,336 B1 * | 4/2002 | Clausen et al. ............... 428/323 |
| 6,375,692 B1 | 4/2002 | Manwiller et al. |
| 6,395,044 B1 | 5/2002 | Swei et al. |
| 6,406,576 B1 | 6/2002 | Benedict et al. |
| 6,451,076 B1 | 9/2002 | Nevoret et al. |
| 6,517,423 B2 | 2/2003 | Ueno |
| 6,551,366 B1 | 4/2003 | D'Souza et al. |
| 6,551,974 B1 | 4/2003 | Conrad et al. |
| 6,645,624 B2 | 11/2003 | Adefris et al. |
| 6,648,999 B2 | 11/2003 | Burdon et al. |
| 6,702,650 B2 | 3/2004 | Adefris |
| 6,753,359 B2 | 6/2004 | Thurber et al. |
| 6,773,475 B2 | 8/2004 | Ohishi |
| 6,790,126 B2 | 9/2004 | Wood et al. |
| 6,797,023 B2 | 9/2004 | Knapp et al. |
| 6,858,292 B2 | 2/2005 | Kendall |
| 6,953,381 B2 | 10/2005 | Siders et al. |
| 7,005,080 B2 | 2/2006 | Holland et al. |
| 7,066,801 B2 | 6/2006 | Balijepalli et al. |
| 7,279,119 B2 | 10/2007 | Hellring et al. |
| 7,294,158 B2 | 11/2007 | Welygan et al. |
| 7,594,845 B2 | 9/2009 | Lugg et al. |
| 7,658,665 B2 | 2/2010 | Subramanian et al. |
| 7,935,158 B2 | 5/2011 | Querel et al. |
| 7,981,173 B2 | 7/2011 | Ali et al. |
| 8,038,751 B2 | 10/2011 | Starling |
| 8,043,393 B2 | 10/2011 | Querel et al. |
| 8,062,098 B2 | 11/2011 | Duescher |
| 8,105,453 B2 | 1/2012 | Kawamura et al. |
| 8,361,176 B2 | 1/2013 | Seth et al. |
| 2001/0003884 A1 | 6/2001 | Wei et al. |
| 2002/0090891 A1 | 7/2002 | Adefris et al. |
| 2003/0066246 A1 | 4/2003 | Swei et al. |
| 2003/0150169 A1 | 8/2003 | Annen |
| 2003/0175498 A1 | 9/2003 | Hunt et al. |
| 2003/0213182 A1 | 11/2003 | Knapp et al. |
| 2004/0067649 A1 | 4/2004 | Hellring et al. |
| 2004/0115431 A1 | 6/2004 | Chen et al. |
| 2005/0064805 A1 | 3/2005 | Culler et al. |
| 2005/0113005 A1 | 5/2005 | Woo et al. |
| 2005/0223649 A1 | 10/2005 | O'Gary et al. |
| 2006/0026904 A1 | 2/2006 | Woo |
| 2006/0046622 A1 | 3/2006 | Prasad |
| 2006/0148392 A1 | 7/2006 | Ono et al. |
| 2006/0183412 A1 | 8/2006 | Allison et al. |
| 2006/0260208 A1 | 11/2006 | Swei et al. |
| 2007/0066197 A1 | 3/2007 | Woo et al. |
| 2007/0243802 A1 | 10/2007 | Petersen et al. |
| 2007/0298240 A1 | 12/2007 | Gobena et al. |
| 2008/0092455 A1 | 4/2008 | You |
| 2008/0172951 A1 * | 7/2008 | Starling ........................ 51/308 |
| 2009/0011692 A1 | 1/2009 | Miekka et al. |
| 2010/0005727 A1 | 1/2010 | Gaeta et al. |
| 2010/0022170 A1 | 1/2010 | Starling et al. |
| 2010/0107509 A1 | 5/2010 | Guselin |
| 2010/0159805 A1 | 6/2010 | Goldsmith et al. |
| 2011/0045739 A1 | 2/2011 | Keijzer et al. |
| 2011/0053460 A1 | 3/2011 | Culler et al. |
| 2012/0094579 A1 | 4/2012 | Starling |
| 2012/0192500 A1 | 8/2012 | Wang et al. |

FOREIGN PATENT DOCUMENTS

| | | |
|---|---|---|
| CN | 101267915 A | 9/2008 |
| DE | 2350139 | 4/1975 |
| EP | 193296 A1 | 9/1986 |
| EP | 444824 A2 | 9/1991 |
| EP | 211591 B1 | 3/1993 |
| EP | 650803 A1 | 5/1995 |
| EP | 1339531 B1 | 8/2007 |
| EP | 2436747 A3 | 4/2012 |
| JP | 61192479 | 8/1986 |
| JP | 61297083 | 12/1986 |
| JP | 6234780 A | 2/1987 |
| JP | H01303626 | 12/1989 |
| JP | H04500044 A | 1/1992 |
| JP | 63052971 | 3/1998 |
| JP | 10-202538 A | 8/1998 |
| JP | 2003011068 | 1/2003 |
| JP | 2003062754 | 3/2003 |
| JP | 2003071729 | 3/2003 |
| JP | 2003511249 | 3/2003 |
| JP | 2004174712 | 6/2004 |
| JP | 2005515950 A | 6/2005 |
| JP | 2005522341 | 7/2005 |
| JP | 2006510499 | 3/2006 |
| JP | 2008000853 | 1/2008 |
| TW | 200422366 A | 11/2004 |
| WO | 9001397 A1 | 2/1990 |
| WO | 9201536 A1 | 2/1992 |
| WO | 0238338 A2 | 5/2002 |
| WO | 02/102920 | 12/2002 |
| WO | 2005099280 A2 | 10/2005 |
| WO | 2006050792 A1 | 5/2006 |
| WO | 2007035292 A1 | 3/2007 |
| WO | 2008008535 A1 | 1/2008 |
| WO | 2008091939 A3 | 7/2008 |
| WO | 2010011579 A2 | 2/2010 |
| WO | 2010075041 A2 | 7/2010 |

OTHER PUBLICATIONS

Norton, Saint-Gobain, "High-Performance Lapping Products for Roll Finishing," Copyright Saint-Gobain Abrasives, Inc., Rev. Feb. 2011, 2 pgs.

Burgess Pigment, "Burgess No. 98, Hydrous Aluminum Silicate" 1 pg.

ADM, "Material Safely Data Sheet—Yelkin TS", Preparation Date: Apr. 17, 2009, Revision Date: Apr. 17, 2009, 7 pgs.

Momentive, "Technical Data Sheet, EPON™ Resin 1001F", Re-issued Sep. 2007, 4 pgs.

Carbide Depot, "Hardness Conversion Chart", Technical Resources for Manufacturing Professionals, 3 pgs.

Woods, Susan, Cutting Tool Engineering Plus, "High-Velocity Grind", Feb. 2011, vol. 63, Issue 2, 9 pgs.

Werner Blank, "Isocyanate—TDI Isocyanate", Last edited on: Jul. 6, 2006, 3 pgs.

BYK Additives & Instruments, "BYK-140 Material Safety Data Sheet" Version 4, Revision Date Feb. 7, 2011, Print Date Feb. 7, 2011, 10 pgs.

BYK Additives & Instruments, "BYK-410 Data Sheet—Liquid Rheology Additives for Solvent-borne and Solvent-free Systems" Data Sheet R200, Issue Feb. 2010, 4 pgs.

Rohm and Haas, "Adcote™ 545S/Coreactant F", Copyright Rohm and Haas, 3 pgs.

3M Innovation, "Systematic Processes for Finishing Wear Resistant Thermal Spray Coatings with Flexible Superabrasives," Sponsored by ESTCP, JG-PP, PEWG, Nov. 19, 2003, 31 pgs.

3M Corporation, "Roll-Grinding, Superfinishing and Microfinishing Systems," Superabrasives and Microfinishing Systems Division, Copyright 3M 1996, 12 pgs.

SKChemicals, Skybon Product Info, accessed Apr. 28, 2012 at http://www.skchemicals.com/english/products/poly/sub/sub3-1.asp, 2 pgs.

(56) References Cited

OTHER PUBLICATIONS

CYTEC "Cymel® Amino Resin Crosslinkers for the Coating Industry, Product and Application Guide, Europe, Middle East and Africa", Copyright 2008 Cytec Industries, Inc., 42 pgs.
Air Products "Dabco© T-12 Catalyst", Copyright, Air Products and Chemicals, Inc., 2003, 2 pgs.
International Search Report for PCT/US2008/051785 mailed Aug. 6, 2008, 1 pg.
International Search Report for PCT/US2009/051045 mailed Mar. 3, 2010, 1 pg.
International Search Report for PCT/US2009/067914 mailed Jul. 26, 2010, 1 pg.
International Search Report for PCT/US2013/032402 mailed Jul. 1, 2013, 1 pg.
International Search Report for PCT/US2012/057852 mailed Mar. 5, 2013, 1 pg.
International Search Report for PCT/US2013/021039 mailed Apr. 25, 2013, 1 pg.
International Search Report for PCT/US2013/034700 mailed Jul. 13, 2013, 1 pg.
International Search Report for PCT/US2013/048730 mailed Sep. 11, 2013, 1 pg.
International Search Report for PCT/US2011/088249 mailed Aug. 29, 2012, 1 pg.

* cited by examiner

ABRASIVE PRODUCTS AND METHODS FOR FINE POLISHING OF OPHTHALMIC LENSES

CROSS-REFERENCE TO RELATED APPLICATION(S)

The present application claims priority from U.S. Provisional Patent Application No. 61/618,058, filed Mar. 30, 2012, entitled "ABRASIVE PRODUCTS AND METHODS FOR FINE POLISHING OF OPHTHALMIC LENSES," naming inventor James Manning, Mark Sternberg and Jianna Wang, which application is incorporated by reference herein in its entirety.

BACKGROUND

1. Field of the Disclosure

The present disclosure is generally directed to coated abrasive products and methods related to the fining and polishing of optical components, including ophthalmic lenses.

2. Description of the Related Art

Abrasive products, such as coated abrasives, bonded abrasives, and loose abrasives are used in various industries to machine work pieces, such as by lapping, grinding, or polishing. Surface processing using abrasive products spans a wide industrial scope from initial coarse material removal to high precision finishing and polishing of surfaces at a submicron level. Effective and efficient finishing and polishing of surfaces, particularly substrates suitable for use in optics, including optical components and ophthalmic lenses, poses numerous challenges.

Surface characteristics, such as surface roughness, can influence the performance and longevity of workpiece surfaces. For example, ophthalmic substrates, including ophthalmic lenses have been precision polished to achieve proper performance and efficiency.

Industries that produce or rely on such highly smooth, highly polished surfaces are sensitive to factors that influence operational costs, including the speed at which a surface can be prepared, the cost of the materials used to prepare that surface, and the costs associated with the time expended to prepare a surface. Typically, industry seeks to achieve cost effective abrasive materials and processes that achieve high material removal rates. However, abrasives and abrasive processes that exhibit high removal rates often also tend to exhibit poor performance, if not impossibility, in achieving desired surface characteristics associated with high precision finishing and polishing of surfaces, such as at a submicron level. Conversely, abrasives that produce such desirable surface characteristics often have low material removal rates, which can require more time and effort to remove a sufficient amount of surface material.

Therefore, the industry continues to demand further improved abrasive products and polishing methods that can offer enhanced processing performance, efficiency, and improved surface quality, particularly at a submicron level.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description, in combination with the figures, is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "averaged," when referring to a value, is intended to mean an average, a geometric mean, or a median value.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting.

Figure 1:
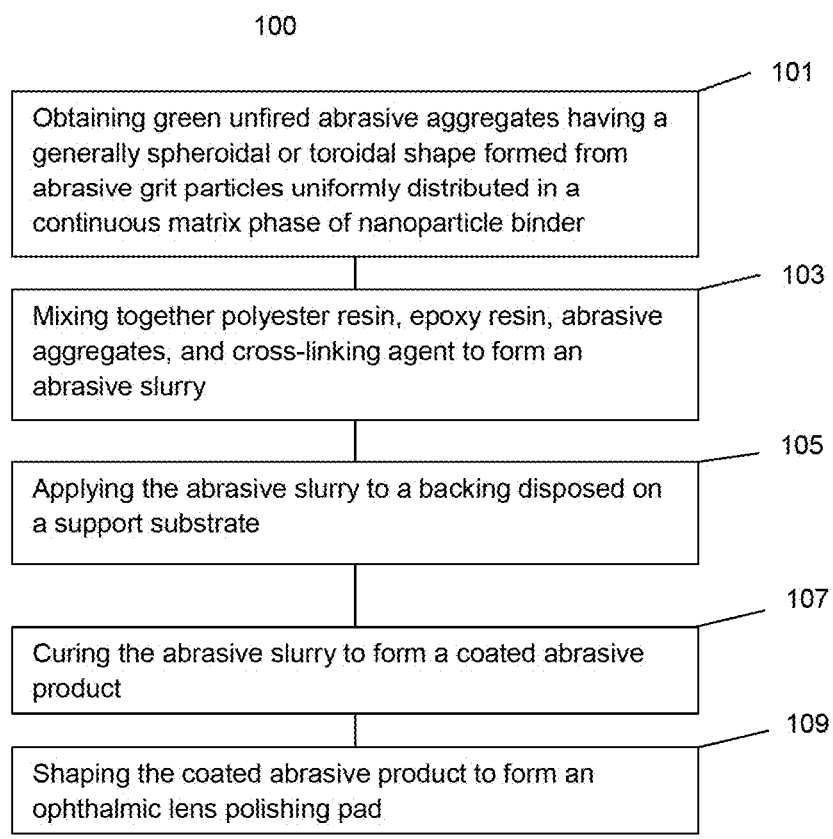
FIG. 1 is a process flow diagram of an embodiment of a method of forming an ophthalmic lens polishing product.

FIG. 1 shows a particular embodiment of a method 100 of making a coated ophthalmic polishing abrasive product. The process is initiated at activity 101 by obtaining green, unfired abrasive aggregates having a generally spheroidal or toroidal shape, the abrasive aggregates being formed from a composition comprising abrasive grit particles and a nanoparticle binder, wherein the nanoparticle binder forms a continuous matrix phase in which the abrasive grit particles are uniformly distributed. In activity 103, mixing together of polyester resin, epoxy resin, abrasive aggregates, and a cross-linking agent occurs to form an abrasive slurry. In activity 105, applying the abrasive slurry to a backing occurs. Curing of the abrasive slurry occurs in activity 107 to form a coated abrasive product. Shaping of the coated abrasive product to form an ophthalmic lens polishing pad occurs in activity 109.

As used herein, the term "aggregate" may be used to refer to a particle made of a plurality of smaller particles that have been combined in such a manner that it is relatively difficult to separate or disintegrate the aggregate particle into smaller particles by the application of pressure or agitation. This is in contrast to the term "agglomerate," which is used herein to refer to a particle made up of a plurality of smaller particles that have been combined in such a manner that it is relatively easy to separate the agglomerate particle or disintegrate the agglomerate particle back into smaller particles, such as by the application of pressure or hand agitation.

Abrasive Aggregates

According to an embodiment, abrasive aggregates are provided that are particularly suitable for machining operations, in which abrasion is carried out to remove material and improve surface quality. Abrasive aggregates can be formed through slurry-based processing. Embodiments can take advantage of spray drying, where a slurry containing the constituent materials of the aggregates and a liquid carrier, such as water, are mixed together, nebulized into droplets, and dried. Certain embodiments combine an abrasive grit, a binder, a dispersant, and a cross-linking agent.

Suitable green, unfired abrasive aggregates include, for instance, those described in, and produced according to the methods of, U.S. Pat. No. 8,038,751 to Starling. The teachings of U.S. Pat. No. 8,038,751 to Starling that are related to the making of green, unfired abrasive aggregates are hereby incorporated by reference for all purposes. Suitable abrasive aggregates are also available from Saint-Gobain Abrasives, Inc. under the brand name Nanozyte® and are exemplary of green, unfired abrasive aggregates. According to certain embodiments, the abrasive product includes green unfired abrasive aggregates having a composite structure, including both abrasive grits that have a size within the microparticle range, and a nanoparticle binder that provides the matrix of the abrasive aggregate in which the abrasive grits are embedded or contained.

Typically, the abrasive aggregates are utilized in the abrasive product without notable post-formation heat treatment, such as calcining, sintering, or recrystallization that would alter the crystallite size, grain size, density, tensile strength, young's modulus, and the like of the abrasive aggregates. Such heat treatment processes, though common, and which are generally carried out in excess of 400° C., generally 500° C. and above, easily ranging from 800° C. to 1200° C. and above for certain ceramic species, are not utilized herein.

Figure 2:
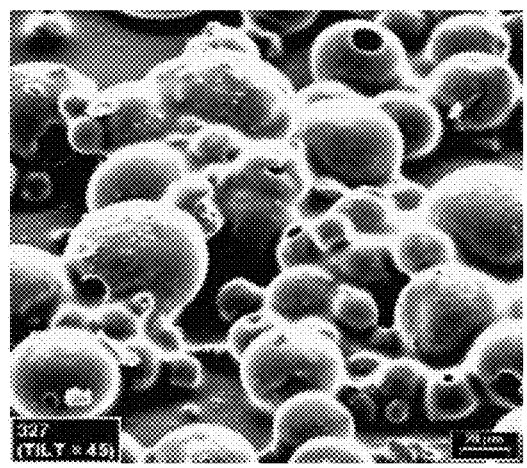
FIG. 2 is a photomicrograph of green unfired abrasive aggregates containing diamond grit dispersed in a nanoparticle binder.

The abrasive aggregates have a notable morphology, characterized by uniform distribution of the abrasive grits in the nanoparticle binder. Additionally, the abrasive aggregates have a generally spheroidal or a toroidal shape, the abrasive aggregates formed from a composition comprising abrasive grit particles and a nanoparticle binder. The aggregates can be solid spheres, spheroids, and toroids. Alternatively, the aggregates can be hollow spheres, spheroids, and toroids. When viewed under magnification, as shown in the scanning electron micrograph of FIG. 2, the abrasive aggregates have a generally spheroidal shape, being characterized as rounded or spherical. In some instances, however, the abrasive aggregates may be observed to have a void near the center of the abrasive aggregate and thus exhibit a more toroid-or torus-like shape, also as seen in the scanning electron micrograph of FIG. 2. Individual particles of the abrasive grit material can be observed to be dispersed over the surface of the abrasive aggregates and within the interior thereof. It is noted that FIG. 2 shows dispersed, individual abrasive aggregates that are bound together in a resin binder system.

The size and the size range of the abrasive aggregates may be adjusted and may depend on many factors, including the composition of the mixture and, if a spray dryer is used in the abrasive aggregate formation, the spray dryer feed rate. For example, abrasive aggregates of sizes including those of approximately 15 micrometers, 20 micrometers, 35 micrometers, 40 micrometers, 45 micrometers, 50 micrometers, 55 micrometers, 60 micrometers, 65 micrometers, and 70 micrometers have been successfully produced using a spray dryer. These abrasive aggregates can include abrasive grit particles ranging from about 5 to about 15 micrometers. In particular embodiments, the abrasive aggregate size ranges from about 20 micrometers to about 70 micrometers, about 30 micrometers to about 65 micrometers, or about 35 micrometers to about 60 micrometers. In another embodiment, the average abrasive aggregate size ranges from about 45 to about 55 micrometers, or about 50 micrometers.

Further study of the abrasive aggregates has revealed that certain spheroids are hollow, while others are essentially filled with grain and/or nanoparticle binder. Hollow particles can be analogized to thick-shelled racquet balls, having a wall thickness ($t_w$) within a range of about 0.08 to about 0.4 times the average particle size of the abrasive aggregates. Process parameters and compositional parameters can be modified to effect different wall thicknesses.

Once formed, the abrasive aggregates may, if desired, be classified and/or separated into various size ranges before being applied to a backing or otherwise utilized in a polishing operation. Classification of the abrasive aggregates can be accomplished by sieving, sorting, or gravimetric separation techniques. In an embodiment, the abrasive aggregates can be classified by being passed through a standard size mesh screen, such as for example a 90 micrometer mesh screen.

Abrasive Grit Particles

The abrasive grit particles that form the abrasive aggregates generally have a Mohs hardness of greater than about 3, and preferably from about 3 to about 10. For particular applications, the abrasive grit particles have a Mohs hardness not less than 5, 6, 7, 8, 9, or 10. In an embodiment the abrasive grit particles have a Mohs hardness of 8. In another embodiment the abrasive grit particles have a Mohs hardness of 9. In yet, another embodiment the abrasive grit particles have a Mohs hardness of 10. The abrasive grit particles are generally believed to serve as the primary active grinding or polishing agent in the abrasive aggregates. Examples of suitable abrasive compositions include non-metallic, inorganic solids such as carbides, oxides, nitrides and certain carbonaceous materials. Oxides include silicon oxide (such as quartz, cristobalite and glassy forms), cerium oxide, zirconium oxide, aluminum oxide. Carbides and nitrides include, but are not limited to, silicon carbide, aluminum, boron nitride (including cubic boron nitride), titanium carbide, titanium nitride, silicon nitride. Carbonaceous materials include diamond, which broadly includes synthetic diamond, diamond-like carbon, and related carbonaceous materials such as fullerite and aggregate diamond nanorods. Materials may also include a wide range of naturally occurring mined minerals, such as garnet, cristobalite, quartz, corundum, feldspar, by way of example. Certain embodiments of the present disclosure, take advantage of diamond, silicon carbide, aluminum oxide, and/or cerium oxide materials, with diamond being shown to be notably effective. In addition, those of skill will appreciate that various other compositions possessing the desired hardness characteristics may be used as abrasive grit particles in the abrasive aggregates of the present disclosure. In addition, in certain embodiments according to the present disclosure, mixtures of two or more different abrasive grit particles can be used in the same abrasive aggregates.

As should be understood from the foregoing description, a wide variety of abrasive grit particles may be utilized in embodiments. Of the foregoing, cubic boron nitride and diamond are considered "superabrasive" particles, and have found widespread commercial use for specialized machining operations, including highly critical polishing operations.

Further, the abrasive grit particles may be treated so as to form a metallurgical coating on the individual particles prior to incorporation into the abrasive aggregates. The superabrasive grits are particularly suitable for coating. Typical metallurgical coatings include nickel, titanium, copper, silver and alloys and mixtures thereof.

In general, the size of the abrasive grit particles lies in the microparticle range. As used herein, the term "microparticle," may be used to refer to a particle having an average particle size of from about 0.1 microns to about 50 microns, preferably not less than about 0.2 microns, about 0.5 microns, or about 0.75 microns, and not greater than about 30 microns, such as not greater than about 25 microns, about 20 microns, about 15 microns, or about 10 microns. Particular embodiments have an average particle size from about 0.5 microns to about 20 microns, such as about 0.5 microns to about 10 microns. The size of the abrasive grit particles can vary upon the type of grit particles being used. For example, in particular embodiments, diamond grit particles can have the size of about 0.5 to about 10 microns, silicon carbide grit particles can have the size of about 3 to about 8 microns, and aluminum oxide grit particles can have a size of about 3 to about 5 microns.

It should be noted that the abrasive grit particles can be formed of abrasive aggregates of smaller particles such as abrasive aggregate nanoparticles, though more commonly the abrasive grits are formed of single particles within the microparticle range. As used herein, the term "nanoparticle," may be used to refer to a particle having an average particle size of from about 5 nm to about 150 nm, typically less than about 100 nm, 80 nm, 60 nm, 50 nm, or less than about 50 nm. For instance, a plurality of nano-sized diamond particles may be aggregated together to provide a microparticle of diamond grit. The size of the abrasive grit particles can vary depending upon the type of grit particles being used.

The abrasive grit particles may, in general, constitute between about 0.1% to about 85% of the abrasive aggregates. The abrasive aggregates more preferably include between about 10% to about 50% by weight of the abrasive grit particles, such as about 12% to about 40% by weight of the abrasive grit particles.

The abrasive aggregates may be formed using a single size of abrasive grit particle, the size of the grit particle and the resultant abrasive aggregates both being tailored to the desired polishing application. In the alternative, mixtures of two or more differently sized abrasive grit particles may be used in combination to form abrasive aggregates having advantageous characteristics attributable to each of the grit particle sizes.

Nanoparticle Binder

The abrasive aggregates according to the present disclosure also include a nanoparticle binder material as stated above. The nanoparticle binder generally forms a continuous matrix phase that functions to form and hold the abrasive grit particles together within the abrasive aggregates in the nature of a binder. In this respect, it should be noted that the nanoparticle binder, while forming a continuous matrix phase, is itself generally made up of individually identifiable nanoparticles that are in intimate contact, interlocked and, to a certain extent, atomically bonded with each other. However, due to the green, unfired state of the thus formed abrasive aggregates, the individual nanoparticles are generally not fused together to form grains, as in the case of a sintered ceramic material. As used herein, description of nanoparticle binder extends to one or multiple species of binders.

The nanoparticle binder material may comprise very fine ceramic and carbonaceous particles such as nano-sized silicon dioxide in a liquid colloid or suspension (known as colloidal silica). Nanoparticle binder materials may also include, but are not limited to, colloidal alumina, nano-sized cerium oxide, nano-sized diamond, and mixtures thereof. Colloidal silica is preferred for use as the nanoparticle binder in certain embodiments of the present disclosure. For example, commercially available nanoparticle binders that have been used successfully include the colloidal silica solutions BINDZEL 2040 BINDZIL 2040 (available from Eka Chemicals Inc. of Marietta, Ga.) and NEXSIL 20 (available from Nyacol Nano Technologies, Inc. of Ashland, Mass.).

Before the mixture is spray dried to form the aggregates, the mixture can include an amount of nanoparticle binder material ranging between about 0.1% to about 80% by weight, such as between about 10% to about 75% by weight based on the wet weight of the mixture. In the formed abrasive aggregates, the nanoparticle binder material may constitute between about 1% to about 90% by weight of the aggregate, such as between about 20% to about 80% by weight of the aggregate, or about 30% to about 75% by weight of the aggregate, all on a dry weight basis.

Plasticizer

The abrasive aggregates also can advantageously include another material which serves primarily as a plasticizer, also known as a dispersant, to promote dispersion of the abrasive grit within the abrasive aggregates. Due to the low processing temperatures used, the plasticizer is believed to remain in the abrasive aggregates, and has been quantified as remaining by thermal gravimetric analysis (TGA). The plasticizer might also assist in holding together the grit particles and nanoparticle binder material in an abrasive aggregate when the mixture is spray dried.

Plasticizers include both organic and inorganic materials, including surfactants and other surface tension modifying species. Particular embodiments make use of organic species, such as polymers and monomers. In an exemplary embodiment, the plasticizer is a polyol. For example, the polyol may be a monomeric polyol or may be a polymeric polyol. An exemplary monomeric polyol includes 1,2-propanediol; 1,4-propanediol; ethylene glycol; glycerin; pentaerythritol; sugar alcohols such as malitol, sorbitol, isomalt, or any combination thereof; or any combination thereof. An exemplary polymeric polyol includes polyethylene glycol; polypropylene glycol; poly (tetramethylene ether) glycol; polyethylene oxide; polypropylene oxide; a reaction product of glycerin and propylene oxide, ethylene oxide, or a combination thereof; a reaction product of a diol and a dicarboxylic acid or its derivative; a natural oil polyol; or any combination thereof. In an example, the polyol may be a polyester polyol, such as a reaction products of a diol and a dicarboxylic acid or its derivative. In another example, the polyol is a polyether polyol, such as polyethylene glycol, polypropylene glycol, polyethylene oxide, polypropylene oxide, or a reaction product of glycerin and propylene oxide or ethylene oxide. In particular, the plasticizer includes polyethylene glycol (PEG).

Fillers

The mixture for forming the abrasive aggregates can optionally contain one or more fillers. Suitable fillers include: metal carbonates; such as calcium carbonate and sodium carbonate; silicas, such as quartz, glass beads, and glass bubbles; silicates, such as talc, clays, and calcium metasilicate; metal sulfates, such as barium sulfate, calcium sulfate, and aluminum sulfate; metal oxides such as calcium oxide, aluminum oxide, including boehmite and/or pseudo-boehmite; mineral phosphates such as apatite, including hydroxylapatite, fluorapatite, chlorapatite, and bromapatite; and mineral hydrates, such as aluminum trihydrate.

Grinding Aids

The abrasive aggregate forming slurry can also optionally contain one or more grinding aids. Suitable grinding aids can be inorganic based, such as halide salts, for example sodium cryolite, potassium tetrafluoroborate, etc.; or organic based, such as chlorinated waxes, for example polyvinyl chloride.

Abrasive Slurry and Preparation

In an embodiment, the abrasive aggregates are preferably combined with a curable resin material, or curable resin mixture, that can be used to adhere the abrasive aggregates onto a surface of a backing. Processes for combining the abrasive aggregates with the resin bonding material include abrasive slurry formation, in which the abrasive aggregates, resin, and any other additives are combined together until thoroughly mixed. In connection with slurry coating a backing, in addition to the abrasive aggregates, the slurry generally also includes a solvent such as water or an organic solvent and a polymeric resin material. The abrasive slurry can additionally comprise other ingredients, such as organic solvents, thixotropic agents, plasticizers, crosslinking agents, surfactants, chain transfer agents, stabilizers, dispersants, catalysts, curing agents, reaction mediators, pigments, dyes, colorants, and fillers. In an embodiment, the slurry can include polymeric resin, abrasive aggregates, one or more organic solvents, one or more thixotropic agents, and one or more crosslinking agents. In another embodiment, the abrasive slurry can, optionally, include a surfactant.

All the slurry ingredients can be thoroughly mixed together using, for example, a high shear mixer. Mixing can be conducted using high shear conditions, moderate shear conditions, low shear conditions, or combinations thereof. Typically, mixing occurs until the ingredients are thoroughly mixed.

In an embodiment, polyester resin, epoxy resin, and surfactant are mixed together to form a base mixture under low shear to moderate shear conditions. Abrasive aggregates are then added to the base mixture under high shear conditions. To complete the formation of the abrasive slurry, a thixotrope is then added to the base mixture under low shear conditions followed by the addition of a cross-linker, also under low shear conditions.

In an embodiment, the abrasive slurry has a composition that can include
between about 10 wt % to about 50 wt % polymer resin,
between about 20 wt % to about 45 wt % abrasive aggregates
between about 0.5 wt % to about 5.0 wt % crosslinking agent,
between about 0.5 wt % to about 10 wt % thixotropic agent
with the remainder organic solvent, where the percentages are based on total weight of the abrasive slurry. Optionally, between about 0.2 wt % to about 5.0 wt % of a surfactant can also be added to the abrasive slurry. If the surfactant is included, the amount of organic solvent can be adjusted so that the total amounts add up to 100 wt %.

The viscosity of the abrasive slurry can be monitored as it is being prepared. In an embodiment, the viscosity of the abrasive slurry is in a range of about 50 cps to about 200 cps prior to addition of the thixotropic agent and the crosslinking agent. After the addition of the thixotropic agent and the crosslinking agent, the abrasive slurry can have a viscosity in the range of about 210 to about 450 cps.

During mixing of the abrasive slurry ingredients, the ingredients may be added to the slurry one by one, in batches, or all at once. Typically the ingredients are added one by one to the abrasive slurry. If the ingredients are added one by one or in batches, the slurry can be agitated for a period of time until the ingredient has sufficiently mixed into the slurry. Typical agitation times range from about 1 minute to about 2 hours, depending on the ingredient or ingredients being added to the abrasive slurry.

In an embodiment, the abrasive slurry will have a ratio of green, unfired abrasive aggregate to polymeric resin in the range from about 1.25:1 to about 2.25:1, about 1.5:1 to about 2:1, about 1.65:1 to about 1.9:1.

In another embodiment, the abrasive slurry will have a ratio of green, unfired abrasive aggregate to polymeric resin in the range from about 0.5:1 to about 1.25:1, about 0.55:1 to about 1.2:1, about 0.6:1 to about 1.15:1, about 0.65:1 to about 1.10:1.

In another embodiment, the abrasive slurry will have a ratio of polymeric resin to crosslinking agent ranging from about 5:1 to about 50:1, about 7:1 to about 45:1.

In another embodiment, the abrasive slurry will have a ratio of polymeric resin to crosslinking agent ranging from about 9.5:1 to about 12.5:1, about 10:1 to about 12:1.

Suitable Polymer Resins

Suitable polymeric resin materials include polyesters, epoxy resins, polyurethanes, polyamides, polyacrylates, polymethacrylates, poly vinyl chlorides, polyethylene, polysiloxane, silicones, polychloroprenes, cellulose acetates, nitrocellulose, natural rubbers, synthetic rubbers, butadiene rubbers, styrene-butadiene rubbers, acrylonitrile-butadiene rubbers, chloroprene resins, starches, shellacs, and mixtures thereof. A polymeric resin mixture may include more than one kind of a polymer resin from a class of polymer resins; for example, a polyester resin may be a mixture of copolyester resins. In an embodiment, the polymeric resin comprises polyester resin, epoxy resin, or mixtures thereof. In particular embodiment, the resin is a mixture of polyester resin and epoxy resin. In an embodiment, the total amount of polymeric resin in the abrasive slurry can be not less than about 10 wt %, not less than about 11 wt %, not less than about 12 wt %, not less than about 13 wt %, not less than about 14 wt %, or not less than about 15 wt %. In another embodiment, the amount of polymeric resin in the abrasive slurry can be not greater than about 50 wt %, not greater than about 48 wt %, not greater than about 45 wt %, not greater than about 44 wt %, not greater than about 42 wt %, not greater than about 40 wt %, or not greater than about 38 wt %. The amount of polymeric resin in the abrasive slurry can be within a range comprising any pair of the previous upper and lower limits. In a particular embodiment, the amount of polymeric resin included in the abrasive slurry can be in the range of not less than about 10 wt % to not greater than about 50 wt %.

Polyester Resin

Suitable polyester resins include linear, saturated copolyester resins that can be amorphous and highly-soluble in standard solvents, such as methyl ethyl ketone (2-butanone) (MEK), Toluol, ethyl acetate, and acetone. Alternatively, other suitable polyester resins can be semi-crystalline to crystalline products that have limited solubility and are applied with solvents such as 1, 3 Dioxolane or tetrahydrofuran (THF). In an embodiment the polyester resin can be a thermoplastic, high molecular weight, aromatic, linear saturated copolyester resin. For example, Vitel 2210 (Bostik, Inc., Massachusetts, USA), or SkybonES120 (SK Chemicals, South Korea or Worthen Industries, Nashua, N.H., USA). In an embodiment, the total amount of polyester resin in the abrasive slurry can be not less than about 2.0 wt %, not less than about 3.0 wt %, not less than about 4.0 wt %, or not less than about 5.0 wt %. In another embodiment, the amount of polyester resin in the abrasive slurry can be not greater than about 40 wt %, not greater than about 35 wt %, not greater than about 30 wt %, not greater than about 25 wt %, not greater than about 24 wt %, not greater than about 23 wt %, not greater than about 22 wt %, not greater than about 21 wt %, or not greater than about 20 wt %. The amount of polyester resin in the abrasive slurry can be within a range comprising any pair of the previous upper and lower limits. In a particular embodiment, the amount of polyester resin included in the abrasive slurry can be in the range of not less than about 2.0 wt % to not greater than about 40 wt %, or not less than about 2.0 wt % to not greater than about 30 wt %, or not less than about 2.5 wt % to not greater than about 25 wt %.

Epoxy Resin

An epoxy resin can include an aromatic epoxy or an aliphatic epoxy. Aromatic epoxies components include one or more epoxy groups and one or more aromatic rings. An example aromatic epoxy includes epoxy derived from a polyphenol, e.g., from bisphenols, such as bisphenol A (4,4'-isopropylidenediphenol), bisphenol F (bis[4-hydroxyphenyl] methane), bisphenol S (4,4'-sulfonyldiphenol), 4,4'-cyclohexylidenebisphenol, 4,4'-biphenol, 4,4'-(9-fluorenylidene) diphenol, or any combination thereof. The bisphenol can be alkoxylated (e.g., ethoxylated or propoxylated) or halogenated (e.g., brominated). Examples of bisphenol epoxies include bisphenol diglycidyl ethers, such as diglycidyl ether of Bisphenol A or Bisphenol F. A further example of an aromatic epoxy includes triphenylolmethane triglycidyl ether, 1,1,1-tris(p-hydroxyphenyl)ethane triglycidyl ether, or an aromatic epoxy derived from a monophenol, e.g., from resorcinol (for example, resorcin diglycidyl ether) or hydroquinone (for example, hydroquinone diglycidyl ether). Another example is nonylphenyl glycidyl ether. In addition, an example of an aromatic epoxy includes epoxy novolac, for example, phenol epoxy novolac and cresol epoxy novolac. Aliphatic epoxy components have one or more epoxy groups and are free of aromatic rings. The polymer precursor for the matrix polymer can include one or more aliphatic epoxies. An example of an aliphatic epoxy includes glycidyl ether of C2-C30 alkyl; 1,2 epoxy of C3-C30 alkyl; mono or multi glycidyl ether of an aliphatic alcohol or polyol such as 1,4-butanediol, neopentyl glycol, cyclohexane dimethanol, dibromo neopentyl glycol, trimethylol propane, polytetramethylene oxide, polyethylene oxide, polypropylene oxide, glycerol, and alkoxylated aliphatic alcohols; or polyols. In one embodiment, the aliphatic epoxy includes one or more cycloaliphatic ring structures. For example, the aliphatic epoxy can have one or more cyclohexene oxide structures, for example, two cyclohexene oxide structures. An example of an aliphatic epoxy comprising a ring structure includes hydrogenated bisphenol A diglycidyl ether, hydrogenated bisphenol F diglycidyl ether, hydrogenated bisphenol S diglycidyl ether, bis(4-hydroxycyclohexyl)methane diglycidyl ether, 2,2-bis(4-hydroxycyclohexyl)propane diglycidyl ether, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, di(3,4-epoxycyclohexylmethyl) hexanedioate, di(3,4-epoxy-6-methylcyclohexylmethyl)hexanedioate, ethylenebis(3,4-epoxycyclohexanecarboxylate), ethanedioldi(3,4-epoxycyclohexylmethyl)ether, or 2-(3,4-epoxycyclohexyl-5,5-spiro-3,4-epoxy)cyclohexane-1,3-dioxane. In an embodiment the epoxy resin is a bisphenol A diglycidyl ether, low molecular weight solid epoxy resin derived from liquid epoxy resin and bisphenol-A. For example, Epon 1001F (Momentive Specialty Chemicals, Columbus, Ohio, USA). In an embodiment, the total amount of epoxy resin in the abrasive slurry can be not less than about 9.0 wt %, not less than about 10 wt %, not less than about 11 wt %, or not less than about 12 wt %. In another embodiment, the amount of epoxy resin in the abrasive slurry can be not greater than about 29 wt %, not greater than about 27 wt %, not greater than about 25 wt %, or not greater than about 23 wt %. The amount of epoxy resin in the abrasive slurry can be within a range comprising any pair of the previous upper and lower limits. In a particular embodiment, the amount of epoxy resin included in the abrasive slurry can be in the range of not less than about 9.0 wt % to not greater than about 29 wt %, not less than about 9.0 wt % to not greater than about 25 wt %, or not less than about 10 wt % to not greater than about 20 wt %.

Polymeric resins of the abrasive slurry can be partially dissolved with solvent (i.e., "diluted") to be more workable and have a particular percent solids range, or viscosity, depending on the application. In an embodiment, the polymeric resin of the abrasive slurry can have a percent solids between about 35 wt % and about 80 wt % based the combined polymeric resin and solvent. In another embodiment, the polyester resin can be diluted with organic solvent to have a solids content in the range of about 20 wt % to about 50 wt %. In another embodiment, the epoxy resin can be diluted with organic solvent to have a solids content in the range of about 40 wt % to about 80 wt %.

As previously discussed, suitable abrasive aggregates are those described in and produced according to the methods of U.S. Pat. No. 8,038,751 to Starling. Preferred are abrasive aggregates available from Saint-Gobain Abrasives, Inc. under the brand name Nanozyte®. In a particular embodiment, the abrasive aggregates contain aluminum oxide abrasive grit. In another particular embodiment, the abrasive aggregates contain diamond abrasive grit. In an embodiment, the amount of abrasive aggregate in the abrasive slurry can be not less than about 20 wt %, not less than about 21 wt %, not less than about 22 wt %, not less than about 24 wt %, not less than about 26 wt %, or not less than about 28 wt %. In another embodiment, the amount of abrasive aggregate in the abrasive slurry can be not greater than about 60 wt %, not greater than about 55 wt %, not greater than about 50 wt %, or not greater than about 45 wt %. The amount of abrasive aggregate in the abrasive slurry can be within a range comprising any pair of the previous upper and lower limits. In a particular embodiment, the amount of abrasive aggregate included in the abrasive slurry can be in the range of not less than about 20 wt % to not greater than about 60 wt %.

Suitable organic solvents are those which dissolve the resins of abrasive slurry, such as, for example, ketones, ethers, polar aprotic solvents, esters, aromatic solvents and aliphatic hydrocarbons, both linear and cyclic. Exemplary ketones include methyl ethyl ketone (2-butanone) (MEK), methyl-isobutylketone (MIBK), acetone and the like. Exemplary ethers include alkoxyalkyl ethers, such as methoxy methyl ether or ethyl ether, tetrahydrofuran, 1,4 dioxane and the like. Polar aprotic solvents include dimethyl formamide, dimethyl sulfoxide and the like. Suitable esters include alkyl acetates, such as ethyl acetate, methyl acetate and the like. Aromatic solvents include alkylaryl solvents, such as toluene, xylene and the like and halogenated aromatics such as chlorobenzene and the like. Hydrocarbon type solvents include, for example, hexane, cyclohexane and the like. A preferred organic solvent is methyl ethyl ketone. In an embodiment, the amount of organic solvent in the abrasive slurry can be not less than about 5.0 wt %, not less than about 6.0 wt %, not less than about 7.0 wt %, not less than about 8.0 wt %, not less than about 9.0 wt %, or not less than about 10 wt %. In another embodiment, the amount of organic solvent in the abrasive slurry can be not greater than about 70 wt %, not greater than about 69 wt %, not greater than about 68 wt %, not greater than about 67 wt %, not greater than about 66 wt %, not greater than about 65 wt %, or not greater than about 64 wt %. The amount of organic solvent in the abrasive slurry can be within a range comprising any pair of the previous upper and lower limits. In a particular embodiment, the amount of organic solvent included in the abrasive slurry can be in the range of not less than about 5.0 wt % to not greater than about 70 wt %.

Suitable surfactants are those that have a low solubility in water and that have amphipathic properties. Suitable surfactants can be naturally occurring or synthetic. In an embodiment, a surfactant is a lecithin, a sulfosuccinate, or combinations thereof. In an embodiment, the amount of surfactant in the abrasive slurry can be not less than about 0.1 wt %, not less than about 0.2 wt %, not less than about 0.3 wt %, not less than about 0.4 wt %, not less than about 0.5 wt %, not less than about 0.6 wt %, or not less than about 0.7 wt %. In another embodiment, the amount of surfactant in the abrasive slurry can be not greater than about 3.0 wt %, not greater than about 2.75 wt %, not greater than about 2.5 wt %, or not greater than about 2.25 wt %. The amount of surfactant in the abrasive slurry can be within a range comprising any pair of the previous upper and lower limits. In a particular embodiment, the amount of surfactant included in the abrasive slurry can be in the range of not less than about 0.3 wt % to not greater than about 3.0 wt %.

Suitable thixotropic agents (i.e., thixotropes) are particulate materials that affect the viscosity, such as such as synthetic silica or alumina. Additionally, more than one type of thixotropic agent or mixtures of thixotropic agents may be used in the abrasive slurry mixture. In an embodiment, the amount of thixotropic agent in the abrasive slurry can be not less than about 0.5 wt %, not less than about 0.6 wt %, or not less than about 0.7 wt %. In another embodiment, the amount of thixotropic agent in the abrasive slurry can be not greater than about 10 wt %, not greater than about 9 wt %, not greater than about 8 wt %, not greater than about 7 wt %, or not greater than about 6 wt %. The amount of thixotropic agent in the abrasive slurry can be within a range comprising any pair of the previous upper and lower limits. In a particular embodiment, the amount of thixotropic agent included in the abrasive slurry can be in the range of not less than about 0.5 wt % to not greater than about 10 wt %.

Suitable cross-linking agents are those that promote crosslinking of the polymeric resin materials in the abrasive slurry. In a preferred embodiment, the crosslinking agent promotes crosslinking of polyester resin, or epoxy resin, or combinations thereof. Preferred cross-linking agents are isocyanates, including polyisocyanates. In an embodiment, the cross-linking agent is a Melamine type cross-linking agent, such as Cymel 301 (Cytec Industries Inc., Stamford, Conn.).

In an embodiment, the amount of cross-linking agent in the abrasive slurry can be not less than about 0.5 wt %, not less than about 0.75 wt %, or not less than about 1.0 wt %. In another embodiment, the amount of cross-linking agent in the abrasive slurry can be not greater than about 5.0 wt %, not greater than about 4.0 wt %, or not greater than about 3.0 wt %. The amount of cross-linking agent in the abrasive slurry can be within a range comprising any pair of the previous upper and lower limits. In a particular embodiment, the amount of cross-linking agent included in the abrasive slurry can be in the range of not less than about 0.5 wt % to not greater than about 5.0 wt %.

Applying the Abrasive Slurry to Backing

Figure 3:
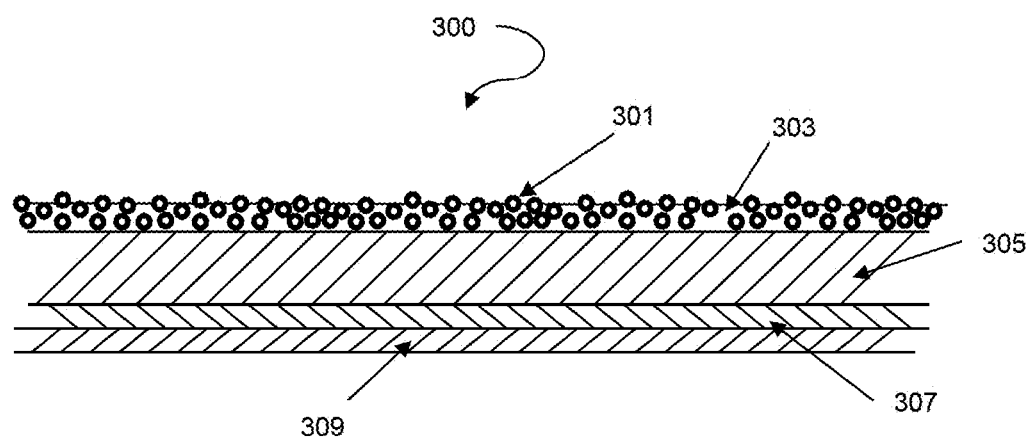
FIG. 3 an illustration of a cross-section of an embodiment of an ophthalmic lens polishing product.
Figure 4:
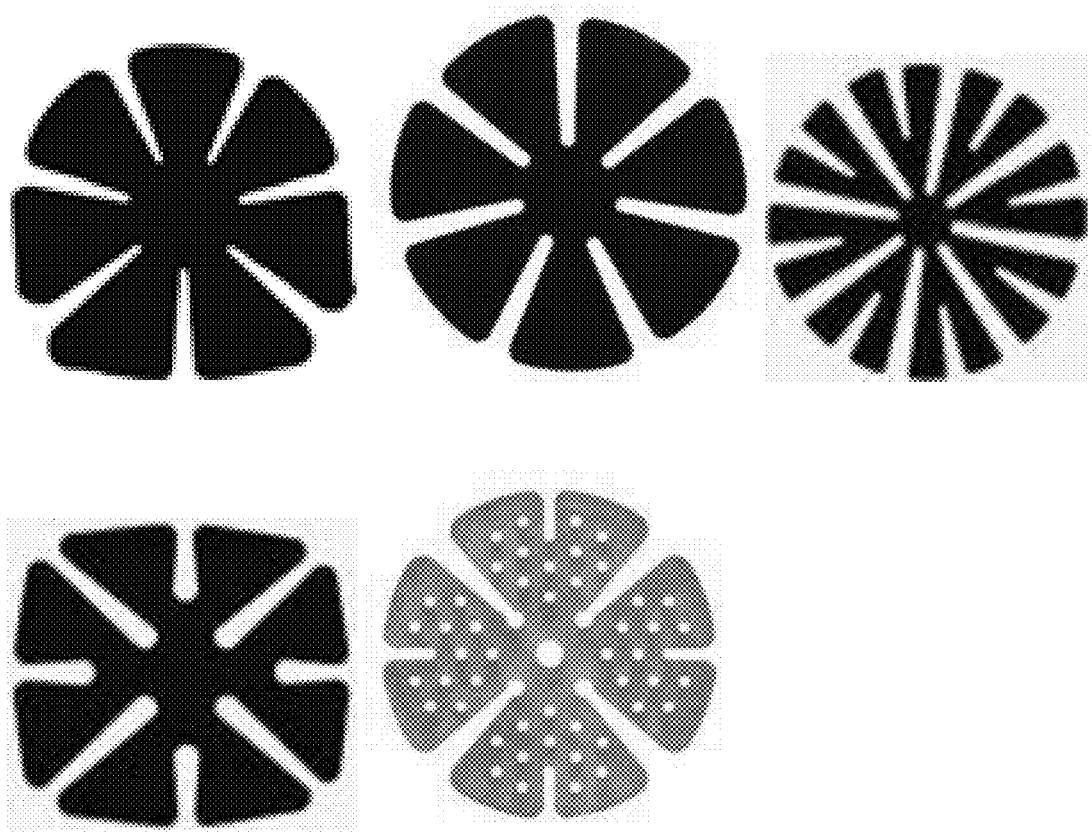
FIG. 4 is an illustration of an embodiment of an ophthalmic lens polishing product having the shape of a floret having multiple extending petals.

The abrasive slurry containing the abrasive aggregate grains is preferably applied to the backing using a blade spreader to form a coating. Alternatively, the slurry coating may be applied using slot die, smooth rolling, gravure, or reverse gravure coating methods. The coating thickness may range from about 1 to about 5 mils in thickness, after drying. As the backing is fed under the blade spreader at a desired coating speed, the abrasive slurry is applied to the backing in the desired thickness. The coat speed is preferably between about 10 to about 60 feet per minute. FIG. 3 shows an embodiment of an abrasive product 300 comprising abrasive aggregates 301 dispersed in a resin composition 303 (a slurry coat) that is disposed on a backing 305, which is disposed over a supporting substrate 307. A contact adhesive layer 309 is disposed on the bottom of the supporting substrate.

In an alternate embodiment, a resin mixture is first coated onto the backing, and the abrasive aggregates are placed onto the resin coated backing through electrostatic attraction (sometimes called "upcoating") or simply down through gravity (e.g., sprinkled onto the backing). Both approaches are well understood in the art, generally first depositing a 'make coat' on the backing, followed by abrasive aggregate application onto the make coat, and subsequent deposition of a 'size coat.' Optionally, a supersize coat may be deposited over the size coat. Further, a pliant coat may be disposed between the make coat and the backing. In another example, a back coat may be disposed over the backing on a side opposite the make coat.

Curing the Abrasive Slurry

The coated backing is then heated in order to cure the resin and bond the abrasive aggregate grains to the backing. The resin can be at least partially cured or fully cured. Additional molding or forming of the partially cured coating can be performed prior to full curing. In general, the coated backing is heated to a temperature of between about 100° C. to less than about 250° C. during the curing process. In certain embodiments of the present disclosure, it is preferred that the curing step be carried at a temperature of less than about 200° C.

Once the resin is fully cured, the abrasive aggregates are bonded to the backing. The cured abrasive coating is capable of being used for a variety of stock removal, finishing, and polishing applications.

In an embodiment the cured abrasive coating has a composition that can include
a range of about 10 wt % to about 60 wt % polymer resin,
a range of about 85 wt % to about 25 wt % abrasive aggregates
a range of about 0.5 wt % to about 5.0 wt % crosslinking agent, and
a range of about 0.5 wt % to about 10 wt % thixotropic agent, wherein the percentages are based on total weight of the cured abrasive coating.

Optionally, between about 0.5 wt % to about 3.0 wt of a surfactant can also be included in the cured abrasive coating. If the surfactant is included, the amount of abrasive aggregate can be adjusted so that the total amounts add up to 100 wt %.

In an embodiment, the total amount of polymeric resin in the cured abrasive coating can be not less than about 10 wt %, not less than about 12 wt %, not less than about 14 wt %, not less than about 16 wt %, not less than about 18 wt %, not less than about 20 wt %, not less than about 22 wt %, or not less than about 24 wt %. In another embodiment, the amount of polymeric resin in the cured abrasive coating can be not greater than about 60 wt %, not greater than about 58 wt %, not greater than about 56 wt %, not greater than about 54 wt %, or not greater than about 52 wt %. The amount of polymeric resin in the cured abrasive coating can be within a range comprising any pair of the previous upper and lower limits. In a particular embodiment, the amount of polymeric resin included in the cured abrasive coating can be in the range of not less than about 16 wt % to not greater than about 60 wt %, not less than about 20 wt % to not greater than about 55 wt %, or not less than about 22 wt % to not greater than about 44 wt %.

In an embodiment, the amount of polyester resin in the cured abrasive coating can be not less than about 3.0 wt %, not less than about 4.0 wt %, not less than about 5.0 wt %, not less than about 6.0 wt %, or not less than about 7.0 wt %. In another embodiment, the amount of polyester resin in the cured abrasive coating can be not greater than about 25 wt %, not greater than about 23 wt %, not greater than about 21 wt %, not greater than about 19 wt %, or not greater than about 17 wt %. The amount of polyester resin in the cured abrasive coating can be within a range comprising any pair of the previous upper and lower limits. In a particular embodiment, the amount of polyester resin included in the cured abrasive coating can be in the range of not less than about 3.0 wt % to not greater than about 25 wt %, not less than about 4.0 wt % to not greater than about 20 wt %, or not less than about 5.0 wt % to not greater than about 15 wt %.

In an embodiment, the amount of epoxy resin in the cured abrasive coating can be not less than about 10 wt %, not less than about 11 wt %, not less than about 12 wt %, not less than about 13 wt %, not less than about 14 wt %, not less than about 15 wt %, not less than about 16 wt %, not less than about 17 wt %, not less than about 18 wt %, or not less than about 19 wt %. In another embodiment, the amount of epoxy resin in the cured abrasive coating can be not greater than about 35 wt %, not greater than about 32 wt %, not greater than about 33 wt %, not greater than about 32 wt %, not greater than about 31 wt %, not greater than about 30 wt %, or not greater than about 29 wt %. The amount of epoxy resin in the cured abrasive coating can be within a range comprising any pair of the previous upper and lower limits. In a particular embodiment, the amount of epoxy resin included in the cured abrasive coating can be in the range of not less than about 12 wt % to not greater than about 35 wt %, not less than about 14 wt % to not greater than about 33 wt %, or not less than about 17 wt % to not greater than about 29 wt %.

In an embodiment, the amount of abrasive aggregate in the cured abrasive coating can be not less than about 20 wt %, not less than about 22 wt %, not less than about 25 wt %, not less than about 28 wt %, not less than about 30 wt %, not less than about 35 wt %, or not less than about 45 wt %. In another embodiment, the amount of abrasive aggregate resin in the cured abrasive coating can be not greater than about 85 wt %, not greater than about 83 wt %, not greater than about 80 wt %, not greater than about 77 wt %, or not greater than about 75 wt %. The amount of abrasive aggregate resin in the cured abrasive coating can be within a range comprising any pair of the previous upper and lower limits. In a particular embodiment, the amount of abrasive aggregate resin included in the cured abrasive coating can be in the range of not less than about 20 wt % to not greater than about 83 wt %, not less than about 23 wt % to not greater than about 80 wt %, not less than about 25 wt % to not greater than about 79 wt %, not less than about 28 wt % to not greater than about 78 wt %, not less than about 30 wt % to not greater than about 77 wt %.

In an embodiment, the amount of thixotropic agent in the cured abrasive coating can be not less than about 0.5 wt %, not less than about 0.6 wt %, not less than about 0.7 wt %, not less than about 0.8 wt %, or not less than about 0.9 wt %. In another embodiment, the amount of thixotropic agent resin in the cured abrasive coating can be not greater than about 10 wt %, not greater than about 9.0 wt %, not greater than about 8.0 wt %, not greater than about 7.0 wt %, not greater than about 6.0 wt %, not greater than about 5.0 wt %, or not greater than about 4.0 wt %. The amount of thixotropic agent resin in the cured abrasive coating can be within a range comprising any pair of the previous upper and lower limits. In a particular embodiment, the amount of thixotropic agent resin included in the cured abrasive coating can be in the range of not less than about 0.5 wt % to not greater than about 10 wt %.

In an embodiment, the amount of cross-linking agent in the cured abrasive coating can be not less than about 0.5 wt %, not less than about 0.6 wt %, not less than about 0.7 wt %, not less than about 0.8 wt %, or not less than about 0.9 wt %. In another embodiment, the amount of cross-linking agent resin in the cured abrasive coating can be not greater than about 5.0 wt %, not greater than about 4.8 wt %, not greater than about 4.6 wt %, not greater than about 4.4 wt %, not greater than about 4.2 wt %, not greater than about 4.0 wt %, not greater than about 3.9 wt %, not greater than about 3.8 wt %, not greater than about 3.7 wt %, or not greater than about 3.6 wt %. The amount of cross-linking agent resin in the cured abrasive coating can be within a range comprising any pair of the previous upper and lower limits. In a particular embodiment, the amount of cross-linking agent resin included in the cured abrasive coating can be in the range of not less than about 0.5 wt % to not greater than about 5.0 wt %.

Backing

The cured abrasive coating is disposed on a backing. Suitable backing materials can be any flexible web, including polymeric film, paper, cloth, metallic film, vulcanized fiber, non-woven substrates, any combinations of the foregoing, and treated versions of any of the foregoing. In an embodiment, the backing comprises a polymeric film, such as a film of polyester, polyurethane, polypropylene, or polyimides, such as a KAPTON film from DuPont. In particular embodiments, polyester films are preferred as the backing material. Polymeric film can be primed to promote adhesion of the abrasive aggregates to the backing. Suitable backings can have a thickness, before being coated, of from about 1 to about 14 mils. In an embodiment, the backing is polyethylene terephthalate.

Support Substrate

The backing can be laminated to one or more stacked support substrates for increased strength, support, or dimensional stability. Lamination of the backing can be accomplished before or after the application of the abrasive coating to the backing. Suitable support substrates include all the materials previously listed as backing materials, including combinations of said backing materials. Lamination can be accomplished by the application of a suitable adhesive between the backing and support substrate. Depending on the support substrate chosen, lamination can also be accomplished by melt lamination or direct extrusion of the support substrate onto the backing. Multiple layers of support substrate can be laminated together using the same lamination techniques used to laminate the backing to the support substrate. In an embodiment, from 1 to 5 layers of support substrate are laminated to the backing. In a particular embodiment, the support substrate is a single layer of polyethylene terephthalate film.

Adhesive Layer

An adhesive layer can be applied directly to the backing, or applied directly to the support substrate if a support substrate is being used. In an embodiment, the adhesive is a laminated pressure sensitive adhesive.

Shaping of the Coated Abrasive

The coated abrasive article can be used in the form of an endless belt, a disk, a sheet, a flexible tape, or can be formed into a particular shape suitable for the fining and polishing of an optical substrate or an optical component. In an embodiment, the coated abrasive is formed into a shape that is suitable for fining and polishing an optical component, such as a lens or prism. In an embodiment, the coated abrasive is cut into a shape conducive to polishing optical components, including ophthalmic lenses. The cutting can be accomplished by die-cutting, laser cutting, or other cutting methods known in the art.

The shape can be a regular or irregular shape. The shape can be a regular or irregular polygon. The shape can be symmetric or asymmetric. The shape can have one or more arms that extend radially from the center of the shape. In an embodiment, the shape of the coated abrasive is adapted to fit onto an abrasive support surface of a state of the art machine used for the fining and polishing of optical lenses. In an embodiment, the shape of the coated abrasive is a floret shape, such as is well known in the art.

Figure 5:
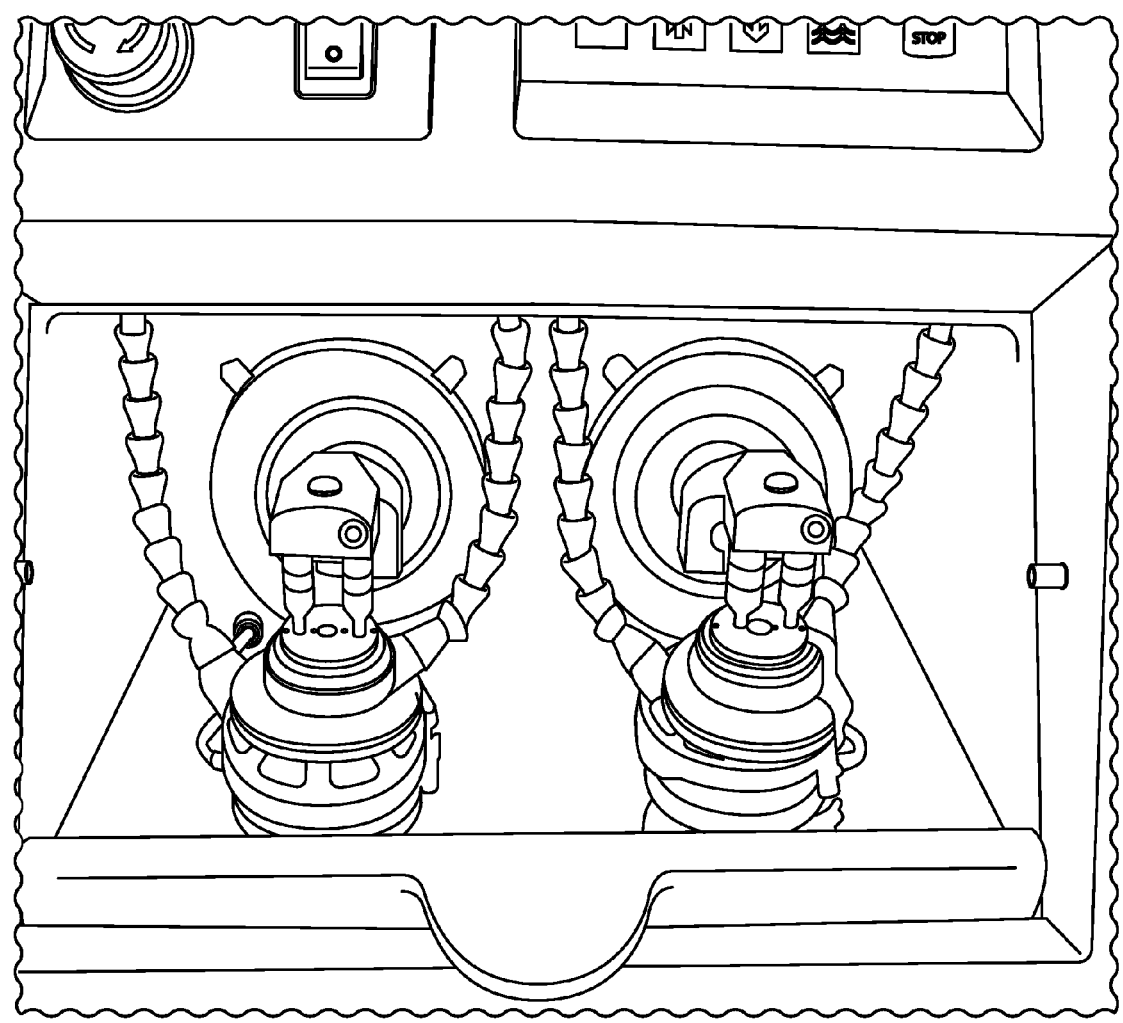
FIG. 5 is a photograph of an embodiment of an ophthalmic lens polishing product installed in a state-of-the art fining and polishing machine and in use polishing an ophthalmic lens.

FIG. 5 shows an illustration of an embodiment of a floret shaped coated abrasive product comprising abrasive aggregates dispersed in a polymer resin coating disposed on a transparent polymer film backing that is laminated to a PET film support substrate.

Fining and Polishing of Optical Substrates

The abrasive product can be used for stock removal, fining, and polishing of optical component substrates, such as ultra violet ("UV") transmitting substrates, visible ("VIS") light and near infrared ("nIR") transmitting substrates, and infrared ("IR") transmitting substrates, or combinations thereof. UV transmitting substrates include: UV fused Silica, CaF2, MgF2, BaF2, Quartz, Sapphire, and the like. VIS/nIR transmitting substrates include: all transparent (i.e., "see through") materials (e.g., glasses, plastics, ceramics, and crystals), BK7, fused silica, and the like. IR transmitting substrates include: ZnSe, ZnS, Cleartran, Si, Ge, Sapphire, and fluorides. In an embodiment, the coated abrasive can be used for the fining and polishing of optical component substrates such as BK7, UV fused silica, IR fused silica, CaF2, ZnSe, Sapphire, MgF2, CR-39 Plastic, Crown Glass, Spectralite, Mid-index plastic, Polycarbonate, High-index plastic, 1.6 Index Plastic, 1.6 Index Glass, 1.66 Index Plastic, 1.7 Index Glass, and 1.8 Index Glass.

In an embodiment, the abrasive product can be used to fine or polish substrate materials known in the art for use as ophthalmic lenses. In another embodiment, the abrasive product can be used to finish or polish glasses and plastics having a refractive index in the range of about 1.48 to about 1.95. In another embodiment, the abrasive product can be used to finish or polish glasses and plastics having an Abbe number in the range of about 90 to 20.

When used for polishing ophthalmic lens substrates, the abrasive products are preferably produced including abrasive aggregates formed from ceria, alumina, silicon carbide, diamond grit, or combinations thereof, combined with a silica nanoparticle binder. The grit particles preferably can have a size of in the range of about 0.5 micrometers to about 12 micrometers. The overall size of the abrasive aggregates is preferably from about 5 micrometers to about 125 micrometers, such as from about 30 micrometers to about 90 micrometers, or from about 45 micrometers to about 65 micrometers. The abrasive aggregates are preferably bonded to polyester polymeric film backing that is laminated to a layer of polyethylene terephthalate support substrate. The supported abrasive film can be used as-is, or can be cut into the shape of a disk or floret to form an abrasive polishing pad, and used for the fining and polishing of optics and optical components, such as ophthalmic lenses. Polishing of surfaces may be carried out, for example, using ophthalmic lens fining and polishing machines known in the art, such as those available from Coburn Technologies, Inc., South Windsor, Conn.

Such ophthalmic lens fining and polishing machines typically take advantage of embodiments of the abrasive product in the form of floret shaped fining and polishing "pads." polymeric films. The ophthalmic lens fining and polishing machines are particularly suited to the polishing of ophthalmic lens workpieces, such as [mirrors, lenses, reticles, windows, prisms, sheets, filters, polarizers, beam splitters, ethlons, and the like]. The ophthalmic lens fining and polishing machines can vary somewhat as to particulars, but all function by bringing the abrasive aggregates contained in polymer resin coating into contact with the surface of the workpiece to be polished. During the polishing process, the polishing machines usually perform some variation of moving at least the coated abrasive product or the surface relative to each other in a first abrading direction, while simultaneously moving at least the coated abrasive product or the surface relative to each other in a second abrading direction not parallel to the first abrading direction while still maintaining contact between the coated abrasive product and the surface. For instance, the motion can typically be in a circular, an oscillating, an orbital, a figure eight motion, or combinations thereof. For an abrasive product in the form of a floret shaped polishing pad, the floret is typically mounted on a lap and the ophthalmic workpiece is brought down from the top to come in contact with the abrasive polishing pad. The lap provides a means of a support for the abrasive product during the polishing process. The abrasive product is secured to the lap by a pressure sensitive adhesive. The lens then moves in a motion, such as in orbital or figure eight motion, over the spinning and oscillating lap with the abrasive product attached. The contact force of the abrasive product on the surface of the workpiece generated by the lap can be precisely controlled, if desired, by known techniques. FIG. 5 shows a photograph of an embodiment of an abrasive product in the shape of a floret installed on the lap of a polishing machine, wherein a lens is being polished and while being sprayed with a cooling fluid of distilled water.

State-of-art conventional surface finishing processes, including the fining and polishing of the surfaces of optics components and optics substrates are typically accomplished by a multi-step, incremental process. The surface is first polished with a relatively coarse coated abrasive and then polished again with a somewhat finer grit coated abrasive. This process is usually repeated several times, with each successive abrasive operation being carried out with a progressively finer grit coated abrasive, until the surface is finally polished to the desired degree of smoothness by using an abrasive slurry of very fine abrasive alumina particles. This type of multi-step polishing procedure has conventionally been required because it is generally understood that the grains of a coated abrasive must be on the same scale as the size of the scratches which are to be removed. Further, although there has been a long felt need in the industry for an alternative to the use of an abrasive slurry to achieve final polishing, it has previously been unachievable and it was believed that final polishing of ophthalmic lenses could only be accomplished by the use of an abrasive slurry. In contrast to the conventional multi-step procedure, however, it has been quite surprisingly and unexpectedly observed that optical components, including ophthalmic lenses, can be properly polished without the use of an abrasive slurry.

Various surface roughness parameters are known in the art and used to describe surface quality. The arithmetical mean ("average") roughness, or Ra, of a surface is a measure of the degree of variations in the overall height profile of a surface over a given standard length. Root mean square roughness, Rq, also called Rrms, is a measure of the root mean square of the roughness over a given standard length. Maximum peak, or maximum height, Ry, measures the maximum distance between the highest peak and the lowest valley along a standard length. Ten-point mean roughness, Rz, is a measure of the average of the five highest peaks and the five lowest valleys. Lower Ra, Rq, Ry, and Rz values are generally indicative of a surface that is smoother and has smaller variations in its overall height between differing locations on the surface (i.e., it has a generally smoother surface profile).

In an embodiment, a lens surface can be polished down to a surface roughness (Ra) of at least about 5 micro inches, such as at least about 4 micro inches, at least about 3 micro inches, or at least about 2 micro inches. In another embodiment, a lens surface can be polished down to a ten-point mean roughness (Rz) of at least about 30 micro inches, such as at least about 25 micro inches, at least about 20 micro inches, at least about 15 micro inches, or at least about 15 micro inches. In another embodiment, the surface can be polished such that the lens it transparent, i.e. free of haze, by visual inspection. In another embodiment, a combination of Ra, Rz, and transparency is achieved.

It has also been surprisingly observed that the amount of time required for polishing using the present embodiments is the same or even less than is required for polishing with an abrasive slurry.

The elimination of the abrasive slurry from the polishing process results in a considerable reduction in the time needed to achieve a desired degree of polishing smoothness, as well as marked reduction in costs due to time saved by not having to switch out successive different abrasive products, as well as not needing to endure the costs related to the proper storage, handling, usage, recovery, and disposal of the conventional abrasive polishing slurry. It is further expected that elimination of the abrasive slurry can lead to increased longevity of the polishing machine and a reduction in routine maintenance.

Without being bound by theory, it is believed that the advantage of the present embodiments may be derived, at least in part, from the unique properties of the green, unfired abrasive aggregates in combination with the composition of the polymer resin coatings of the present disclosure.

The properties and advantage of the present disclosure are illustrated in further detail in the following nonlimiting examples. Unless otherwise indicated, temperatures are expressed in degrees Celsius, pressure is ambient, and concentrations are expressed in weight percentages.

Components Listing

Vitel 2210 (diluted 40% MEK)—thermoplastic, high molecular weight, aromatic, linear saturated copolyester resin (Rohm and Haas Company, a wholly owned division of Dow Chemical, Philadelphia, Pa., USA).

Epon 1001F (diluted 60% MEK)—bisphenol A diglycidyl ether, low molecular weight solid epoxy resin derived from liquid epoxy resin and bisphenol-A (Momentive Specialty Chemicals, Columbus, Ohio, USA).

Skybon ES 120 (diluted—42% solids in MEK)—thermoplastic, high molecular weight, solvent borne copolyester resin (SK Chemicals Company, Korea or SK USA, Inc, Fort Lee, N.J.).

Methyl Ethyl Ketone (MEK)—commonly commercially available, reagent grade.

Toluene—commonly commercially available, reagent grade.

Yelkins TS—Soya lecithin (Archer Daniels Midland Company, Decatur, Ill., USA).

$CeO_2$ 1.5 Nanozyte—green, unfired abrasive aggregates comprising cerium oxide grit having an average size of 1.5 µm that are dispersed in nanoparticle colloidal silica (Saint-Gobain Abrasives, Inc., Worcester, Mass.).

AlO 8000 Nanozyte—green, unfired abrasive aggregates comprising aluminum oxide grit having an average size conforming to JIS 8000 (0.9-1.5 µm) that are dispersed in nanoparticle colloidal silica (Saint-Gobain Abrasives, Inc., Worcester, Mass.).

Diamond 9 Nanozyte—green, unfired abrasive aggregates comprising diamond grit having an average size of 9 µm that is dispersed in nanoparticle colloidal silica (Saint-Gobain Abrasives, Inc., Worcester, Mass.).

Diamond 1 Nanozyte—green, unfired abrasive aggregates comprising diamond grit having an average size of 1 µm that is dispersed in nanoparticle colloidal silica (Saint-Gobain Abrasives, Inc., Worcester, Mass.).

Burgess 98—thixotropic agent, hydrous aluminum silicate (Burgess Pigment Company, Sandersville, Ga., USA).

BYK-410—thixotropic agent solution of modified urea (BYK USA Inc., Wallingford, Conn.).

Aerosol OT—a surfactant, sodium bis(2-ethylhexyl) sulfosuccinate (Cytec Industries, Inc., Woodland Park, N.J.).

Coreactant F—isocyanate crosslinking agent (Rohm and Haas Company, a wholly owned division of Dow Chemical, Philadelphia, Pa.).

Bindzil 2040—colloidal silica solution (available from Eka Chemicals Inc. of Marietta, Ga.)

PEG 200—polyethylene glycol

EXAMPLE 1

Making of Coated Abrasive Product

1A. Abrasive Aggregates

The below listed green, unfired abrasive aggregates made according to the teachings and methods of U.S. patent application Ser. No. Publication 12/018,589 A1 to Starling were obtained from Saint-Gobain Abrasives, Worcester, Mass.:

1) $CeO_2$ 1.5 µm Nanozyte;

2) AlO 8000 Nanozyte;

3) Diamond 9 µm Nanozyte; and

4) Diamond 1 µm Nanozyte.

The abrasive aggregates were sieved though a 170 mesh screen having 90 micron openings and had an average abrasive aggregate particle size between 35 to 60 micrometers. The abrasive aggregates were formed from a mixture provided in Table 1 below.

TABLE 1

| Abrasive Aggregates Slurry Composition | |
|---|---|
| Component | Wt % in mixture |
| Abrasive grit | 27.4 |
| BINDZIL 2040 silica sol | 60.7 |
| PEG 200 | 3.6 |
| Deionized water | 8.3 |
| Total | 100.0 |

1B. Abrasive Slurry Preparation

An abrasive slurry composition was made by mixing together the following components listed in the table(s) below.

TABLE 2

Abrasive Slurry Composition(s)

| Component(s) | Wt % CeO$_2$ 1.5 μm A | Wt % AlO 8000 B | Wt % Diamond 9 μm C | Wt % Diamond 1 μm D |
|---|---|---|---|---|
| Vitel 2210 @ 42% in MEK | 40.13 | 47.10 | 12.87 | 12.87 |
| Epon 1001F @ 60% in MEK | — | — | 23.67 | 23.67 |
| MEK | 7.30 | 18.84 | 23.67 | 23.67 |
| Toluene | 14.59 | — | — | — |
| Yelkins TS | 1.28 | 0.25 | 0.98 | 0.98 |
| Nanozyte Aggregate | 32.83 | 31.71 | 34.28 | 34.28 |
| Aerosol OT | 0.43 | — | — | — |
| BYK-410 | 1.57 | 0.94 | 0.88 | 0.88 |
| Burgess 98 | — | — | 1.92 | 1.92 |
| Coreactant F | 1.86 | 1.16 | 1.72 | 1.72 |
| Total | 99.99 | 100.00 | 99.99 | 99.99 |

For each composition, any diluted Vitel 2210 (42% solids), diluted Epon 1001F (60% solids), MEK, Toluene, and Yelkins TS were mixed together in a high shear mixer until thoroughly mixed. The mixture was again agitated under high shear and the Nanozyte abrasive aggregate for the mixture was added until thoroughly mixed in. The BYK-410 was added to the mixture under low shear until thoroughly mixed. The mixture was again agitated under low shear and the Coreactant F was added. The mixture was allowed to stand for approximately 45 minutes and then agitated lightly. The abrasive slurry compositions had a viscosity in the range of about 200 to 400 cps.

1C. Abrasive Film Preparation

The abrasive slurry compositions were applied to a 3 mil polyethylene terephthalate (PET) polymeric film that was adhered to a support substrate of polyethylene terephthalate film. The abrasive slurry coated films were cured by oven at a temperature in the range of about 150° C. to 205° C. Upon exiting the oven, the abrasive resin coating compositions were substantially complete and the abrasive aggregates were substantially bonded to the film.

1D. Formation of Abrasive Pads

A pressure sensitive adhesive material was disposed onto the bottom of the support substrate of each of the inventive abrasive films. The inventive coated abrasives were then formed by die-cutting into a plurality of floret shaped abrasive polishing pads.

EXAMPLE 2

Ophthalmic Lens Polishing—CR-39—Diamond Aggregates

A Coburn Technologies Acuity™ Fining/Polishing System (Coburn Technologies, Inc., South Windsor, Conn.) was used to compare the polishing performance of inventive the inventive abrasive polishing pads prepared in Example 1 to a state-of-the-art conventional polishing method that requires the use of an aqueous abrasive slurry, High-Pro premium polish, part number 3315G, (PSI, Inc. (Practical Systems, Inc of Odessa, Fla.) a high grade aluminum oxide based plastic polishing compound. The workpiece being polished was an ophthalmic CR-39 lens. Inventive polishing pads comprising Diamond 9 micron aggregates ("C" prepared above) and Diamond 1 micron aggregates ("D" prepared above) were used to polish the CR-39 lens workpiece. The Acuity machine was set for a pressure and polishing time as indicated in the table below. The results of the comparative testing are presented in the table below.

TABLE 3

Lens Polishing - CR-39 - Diamond

| Lens Type | Test | Step | Abrasive Used | Time | Pressure | Results Ra | Results Rz |
|---|---|---|---|---|---|---|---|
| CR-39 | Control | Fining | Q361 15 um | 2 min | 18 psi | 11.4 | 81.2 |
|  |  | Polishing | Slurry | 6 min | 18 psi | 1.9 | 10.5 |
| CR-39 | Exp. 1 | Fining | Q361 15 um | 2 min | 18 psi | 11 | 75.1 |
|  |  | Polishing | Diamond 9μ - C | 3 min | 18 psi | 2.3 | 12.1 |
|  |  | Polishing | Diamond 1μ - D | 3 min | 18 psi | 1.6 | 9.0 |

As shown above, the CR-39 lens in both the Control and Exp. 1 is first finished with a conventional finishing coated abrasive pad having aluminum oxide as the abrasive (Q361 15μ fining pad, Saint-Gobain Abrasives, Inc., Worcester, Mass.). The total polishing time required for both the conventional abrasive slurry polishing process and the inventive embodiment was equal. The inventive process polished the lens first with the Diamond 9μ polishing pad for three minutes followed by polishing with the Diamond 1μ polishing pad for three minutes. The coolant fluid applied over the inventive embodiments during polishing was distilled water only, which provided for less mess and faster clean-up of the workpiece and polishing equipment. The Ra and Rz surface roughness values achieved were both lower than those of the conventional abrasive slurry. It is clearly demonstrated that the inventive embodiments are a suitable replacement for the conventional abrasive slurry. It was observed by visual inspection that that the polished CR-39 lens was clear (i.e., "not hazy").

EXAMPLE 3

Ophthalmic Lens Polishing—Polycarbonate—Diamond Aggregates

Experiment 2 was conducted in the same manner as Experiment 1, but with a polycarbonate lens instead. The Acuity machine was set for the pressure and polishing times indicated in the table below. The results of the comparative testing are presented in the table below.

TABLE 4

Lens Polishing - Polycarbonate - Diamond Aggregates

| Lens Type | Test | Step | Abrasive Used | Time | Pressure | Results Ra | Results Rz |
|---|---|---|---|---|---|---|---|
| Polycarbonate | Control | Fining | Q361 30 um | 2 min | 18 psi | 13.7 | 102.3 |
|  |  | Polishing | Slurry | 6 min | 18 psi | 2.4 | 11.6 |
| Polycarbonate | Exp. 2 | Fining | Q361 30 um | 2 min | 18 psi | 12.1 | 104.1 |
|  |  | Polishing | Diamond 9μ - C | 3 min | 18 psi | 2.9 | 18.6 |
|  |  | Polishing | Diamond 1μ - D | 3 min | 18 psi | 2 | 11.2 |

As shown above, the polycarbonate lens in the Control and Exp. 2 was first finished with a conventional finishing coated abrasive pad having aluminum oxide as the abrasive (Q361

30μ fining pad, Saint-Gobain Abrasives, Inc., Worcester, Mass.). The total polishing time required for both the conventional abrasive slurry polishing process and the inventive embodiment was equal. The inventive process polished the lens first with the Diamond 9μ polishing pad for three minutes followed by polishing with the Diamond 1μ polishing pad for three minutes. The coolant fluid applied over the inventive embodiments during polishing was distilled water only, which provided for less mess and faster clean-up of the workpiece and polishing equipment. The Ra and Rz surface roughness values achieved were both lower than those of the conventional abrasive slurry. It was again clearly demonstrated that the inventive embodiments are a suitable replacement for the conventional abrasive slurry. It was observed by visual inspection that that the polished polycarbonate lens was clear (i.e., "not hazy").

EXAMPLE 4

Lens Polishing—CR-39—Cerium Oxide Aggregates

Lens polishing using an Acuity polishing machine was conducted in the same manner generally described above. Inventive abrasive polishing pads comprised cerium oxide 1.5μ aggregates ("A" prepared above). The Acuity machine was set for the pressure and polishing times indicated in the table below. The results of the comparative testing are presented in the table below.

TABLE 5

| Lens Polishing - CR-39 - Cerium Oxide | | | | | | | |
|---|---|---|---|---|---|---|---|
| Lens | | | Material | | Pres- | Results | |
| Type | Test | Step | Used | Time | sure | Ra | Rz |
| CR-39 | Exp. 3 | Fining Polishing | 361M 15 um CeO 1.5μ - A | 1 min 2 min | 20 psi 20 psi | 13.6 3.2 | 102 20 |
| CR-39 | Exp. 4 | Fining Polishing | 361M 15 um CeO 1.5μ - A | 1 min 2 min | 20 psi 20 psi | 13.8 3.4 | 112 29 |

As shown above, the CR-39 lens in Exp. 3 and Exp. 4 were first finished with a conventional finishing coated abrasive pad having aluminum oxide as the abrasive (361 M 15 um fining pad, 3M, St. Paul, Minn.). The total polishing time was only 2 minutes, approximately ⅓ of the normal time required to adequately polish a lens using the conventional abrasive slurry (see Control examples described above). The coolant fluid applied over the inventive embodiments during polishing was distilled water only. Surprisingly, the inventive embodiments were still able to achieve Ra and Rz surface roughness values comparable to the conventional abrasive slurry even though the polishing time was reduced. The results indicate that the inventive embodiments are a suitable replacement for the conventional abrasive slurry. It was observed by visual inspection that that the polished CR-39 lens was clear (i.e., "not hazy").

EXAMPLE 5

Lens Polishing—Polycarbonate—Cerium Oxide Aggregates

Lens polishing using an Acuity polishing machine was conducted in the same manner generally described above. Inventive abrasive polishing pads comprised cerium oxide 1.5μ aggregates ("A" prepared above). The Acuity machine was set for the pressure and polishing times indicated in the table below. The results of the comparative testing are presented in the table below.

TABLE 6

| Lens Polishing - Polycarbonate - Cerium Oxide | | | | | | | |
|---|---|---|---|---|---|---|---|
| Lens | | | Material | | Pres- | Results | |
| Type | Test | Step | Used | Time | sure | Ra | Rz |
| Poly-carbonate | Exp. 5 | Fining Polishing Polishing Polishing | 361M 30 um CeO 1.5μ - A CeO 1.5μ - A CeO 1.5μ - A | 1 min 2 min 2 min 2 min | 20 psi 20 psi 20 psi 20 psi | 14 5.4 3.9 2.6 | 102 59 37 30 |
| Poly-carbonate | Exp. 6 | Fining Polishing | 320 SiC CeO 1.5μ - A | 2 min 2 min | 20 psi 20 psi | 10.4 1.6 | 91 11 |

As shown above, the polycarbonate lenses in Exp. 5 and Exp. 6 were first finished with a conventional finishing coated abrasive pad; one having aluminum oxide as the abrasive (361 M 30 um fining pad, 3M, St. Paul, Minn.) in Exp. 5 and one having silicon carbide in Exp. 6 (320 grit SiC). The total polishing time for Exp. 5 was six minutes (three 2-minute intervals). The coolant fluid applied over the inventive embodiments during polishing was distilled water only. The Ra and Rz surface roughness values achieved by the inventive embodiments were comparable to the conventional abrasive slurry. It was observed by visual inspection that that the polished polycarbonate lens was clear (i.e., "not hazy").

EXAMPLE 6

Lens Polishing—Polycarbonate—Aluminum Oxide Aggregates

Lens polishing using an Acuity polishing machine was conducted in the same manner generally described above. Inventive abrasive polishing pads comprised aluminum oxide ALO 8000 aggregates ("B" prepared above). The Acuity machine was set for the pressure and polishing times indicated in the table below. The results of the comparative testing are presented in the table below.

TABLE 7

| Lens Polishing - Polycarbonate - Aluminum Oxide | | | | | | | |
|---|---|---|---|---|---|---|---|
| Lens | | | Material | | Pres- | Results | |
| Type | Test | Step | Used | Time | sure | Ra | Rz |
| Poly-carbonate | Exp. 7 | Fining Polishing | 320 SiC AlO 8000 - B | 2 min 2 min | 20 psi 20 psi | 8.9 1.8 | 75 27 |

The total polishing time for Exp. 7 was approximately ⅓ of the normal time required to adequately polish a lens using the conventional abrasive slurry (see Control examples described above). The coolant fluid applied over the inventive embodiment during polishing was distilled water only. Surprisingly, the inventive embodiment was able to achieve Ra and Rz surface roughness values better than the conventional abrasive slurry even though the polishing time was reduced. The results indicate that the inventive embodiment is a suitable replacement for the conventional abrasive slurry. It was observed by visual inspection that that the polished polycarbonate lens was clear (i.e., "not hazy").

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A coated abrasive product comprising:
    a backing;
    a cured abrasive composition, and
    a supporting substrate,
    wherein the cured abrasive composition comprises
       polymeric resin,
       abrasive aggregates,
       a crosslinking agent, and
       a thixotropic agent
    wherein the abrasive aggregates are green, unfired and have a generally spheroidal or toroidal shape and are formed from a composition comprising abrasive grit particles and a nanoparticle binder, and
    wherein the cured abrasive composition is disposed on the backing,
    wherein the supporting substrate is disposed onto the bottom of the backing, and
    wherein the ratio of green, unfired abrasive aggregate to polymeric resin ranges from about 0.5:1 to about 1.25:1.

2. The coated abrasive product of claim 1, wherein the coated abrasive product is shaped to conform to the support of an ophthalmic polishing machine.

3. The coated abrasive product of claim 1, wherein the ratio of polymeric resin to crosslinking agent ranges from about 5:1 to about 50:1.

4. The coated abrasive product of claim 1, wherein the cured abrasive composition further comprises a surfactant.

5. The coated abrasive product of claim 1, wherein the polymeric resin is a polyester resin, an epoxy resin, or combinations thereof.

6. The coated abrasive product of claim 5, wherein the polymeric resin is a combination of polyester resin and epoxy resin.

7. The coated abrasive product of claim 6, wherein the ratio of polyester resin to epoxy resin ranges from about 1:4 to about 1:2.2.

8. The coated abrasive product of claim 1, wherein the cured abrasive composition comprises
    about 10 wt % to about 50 wt % polymeric resin,
    about 20 wt % to about 45 wt % green, unfired abrasive aggregates,
    about 0.5 wt % to about 5.0 wt % of crosslinking agent, and
    about 0.5 wt % to about 10 wt % of thixotropic agent.

9. The coated abrasive product of claim 8, wherein the cured abrasive composition further comprises about 0.5 to about 5.0 wt % of surfactant.

10. The coated abrasive product of claim 8, wherein the polymeric resin comprises about 2.0 wt % to about 15 wt % of polyester resin and the remainder is epoxy resin.

11. The coated abrasive product of claim 8, wherein the thixotropic agent comprises about 0.5 wt % to about 3.0 wt % of a first thixotrope and the remainder is a second thixotrope.

12. The coated abrasive product of claim 8, wherein the backing is a polymeric film.

13. A coated abrasive product comprising
    a polymeric film backing,
    a support substrate adhered to the bottom of the film backing,
    a contact adhesive layer disposed on the bottom of the support substrate, and
    a cured abrasive composition disposed on the backing comprising:
       polymeric resin;
       green, unfired abrasive aggregates having a generally spheroidal or toroidal shape, the aggregates formed from a composition comprising diamond abrasive grit particles and a nanoparticle binder;
       a crosslinking agent; and
       a thixotropic agent;
    wherein the ratio of green, unfired abrasive aggregate to polymeric resin ranges from about 0.5:1 to about 1.25:1 and the ratio of polymeric resin to crosslinking agent ranges from about 5:1 to about 50:1.

14. The coated abrasive product of claim 13, wherein the cured abrasive composition comprises:
    about 10 wt % to about 60 wt % polymeric resin;
    about 85 wt % to about 25 wt % green, unfired abrasive aggregates;
    about 0.5 wt % to about 5.0 wt % of crosslinking agent; and
    about 0.5 wt % to about 10 wt % of thixotropic agent.

15. The coated abrasive product of claim 14, wherein the cured abrasive composition further comprises about 0.5 to about 3.0 wt % of surfactant.

16. The coated abrasive product of claim 14, wherein the polymeric resin comprises about 4.0 wt % to about 25 wt % of polyester resin and the remainder is epoxy resin.

17. The coated abrasive product of claim 14, wherein the thixotropic agent comprises about 0.5 wt % to about 3.0 wt % of a first thixotrope and the remainder is a second thixotrope.

18. A coated abrasive product comprising:
    a backing;
    a binder composition disposed on the backing; and
    abrasive aggregates dispersed within the binder composition;
    wherein the binder composition comprises a polymeric mixture of polyester resin and epoxy resin present in a ratio of about 1:2 to about 1:3.5 by weight, respectively, and
    wherein the abrasive aggregates and binder composition are present in a ratio of about 1:1.5 to about 1:2 by weight, respectively, and
    wherein the abrasive aggregates are green, unfired and comprise diamond abrasive grit particles, and a nanoparticle binder, the nanoparticle binder having a continuous matrix phase in which the diamond grit particles are uniformly distributed, and
    wherein the coated abrasive product is capable of polishing an optical component substrate to a surface roughness Ra of at least about 5 micro inches, a ten-point mean surface roughness Rz of at least about 30 micro inches, and wherein the polished substrate is visually free of haze.

19. The coated abrasive of product of claim 18, wherein the optical component substrate has a refractive index value in a range from 1.48 to 1.95.

* * * * *

UNITED STATES PATENT AND TRADEMARK OFFICE
CERTIFICATE OF CORRECTION

PATENT NO. : 8,968,435 B2  Page 1 of 1
APPLICATION NO. : 13/853877
DATED : March 3, 2015
INVENTOR(S) : James J. Manning et al.

It is certified that error appears in the above-identified patent and that said Letters Patent is hereby corrected as shown below:

Title Page, Item (56), please insert the below listed U.S. Patent Document

--5137542 08/1992 Buchanan et al.--.

Title Page, Item (56), please insert the below listed Other Publications

--International Search Report for PCT/US2011/068249 mailed August 29, 2012.--.

Signed and Sealed this
Fifth Day of April, 2016

Michelle K. Lee
*Director of the United States Patent and Trademark Office*